(12) United States Patent
Weber et al.

(10) Patent No.: US 9,396,461 B2
(45) Date of Patent: *Jul. 19, 2016

(54) ADJUSTING DIFFERENT AREAS OF A PAYMENT INSTRUMENT IMAGE INDEPENDENTLY

(71) Applicants: Scott Weber, Arlington, TX (US); Rian Maloney, Frisco, TX (US)

(72) Inventors: Scott Weber, Arlington, TX (US); Rian Maloney, Frisco, TX (US)

(73) Assignee: Digital Check Corporation, Northbrook, IL (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/256,425

(22) Filed: Apr. 18, 2014

(65) Prior Publication Data

US 2015/0302244 A1 Oct. 22, 2015

(51) Int. Cl.
*G06Q 20/04* (2012.01)
*G06K 9/03* (2006.01)
*G06Q 40/00* (2012.01)

(52) U.S. Cl.
CPC .............. *G06Q 20/042* (2013.01); *G06K 9/036* (2013.01); *G06Q 20/0425* (2013.01)

(58) Field of Classification Search
CPC ... G06Q 20/042; G06Q 20/40; G06Q 20/108; G06K 2209/01; G06K 9/00463; G06K 9/2054; G07D 7/04
See application file for complete search history.

(56) References Cited

U.S. PATENT DOCUMENTS

| | | | |
|---|---|---|---|
| 2005/0271302 A1* | 12/2005 | Khamene | G06K 9/00986 382/294 |
| 2006/0106717 A1 | 5/2006 | Randle et al. | |
| 2006/0115141 A1* | 6/2006 | Koakutsu | G06K 7/084 382/139 |
| 2008/0180750 A1 | 7/2008 | Feldman | |
| 2009/0060378 A1* | 3/2009 | Curtis | H04N 1/407 382/274 |
| 2012/0109825 A1 | 5/2012 | Haschka et al. | |
| 2012/0136782 A1 | 5/2012 | Norman et al. | |
| 2014/0193063 A1* | 7/2014 | Moon | G06K 9/78 382/137 |

OTHER PUBLICATIONS

International Search Report and Written Opinion issued in International Application No. PCT/US2015/026485 on Jul. 27, 2015; 13 pages.
U.S. Appl. No. 14/256,471, filed Apr. 18, 2014, Weber et al.

* cited by examiner

*Primary Examiner* — Amara Abdi
(74) *Attorney, Agent, or Firm* — Fish & Richardson P.C.

(57) ABSTRACT

The present disclosure involves systems, software, and computer-implemented methods for allowing independent adjustment for different areas of a payment instrument image. An example method includes updating an image property of an area of a clearing payment instrument image associated with a tangible payment instrument including a payee, a payor, an amount, and an authorization, the tangible payment instrument to be submitted for electronic transaction clearing, wherein the clearing payment instrument image is associated with a first value of the image property, the image property of the area is updated to a second value different than the first value of the image property, and the area of the clearing payment instrument image includes less than the entire clearing payment image; and storing the updated clearing payment instrument image in response to updating the image property.

34 Claims, 11 Drawing Sheets

ADJUSTING DIFFERENT AREAS OF A PAYMENT INSTRUMENT IMAGE INDEPENDENTLY

BACKGROUND

The present disclosure involves systems, software, and computer-implemented methods for allowing independent adjustment of different areas of a payment instrument image. In check processing, physical payment instruments are scanned using image capture devices (e.g., scanners) to produce payment instrument images. These payment instrument images may be used in lieu of the original physical payment instruments when clearing transactions between banks.

SUMMARY

The present disclosure involves systems, software, and computer-implemented methods for allowing independent adjustment of different areas of a payment instrument image. In one general aspect, an example method includes updating an image property of an area of a clearing payment instrument image associated with a tangible payment instrument including a payee, a payor, an amount, and an authorization, the tangible payment instrument to be submitted for electronic transaction clearing, wherein the clearing payment instrument image is associated with a first value of the image property, the image property of the area is updated to a second value different than the first value of the image property, and the area of the clearing payment instrument image includes less than the entire clearing payment image; and storing the updated clearing payment instrument image in response to updating the image property.

In another general aspect, an example method includes receiving an original payment instrument image from the remote storage location; presenting a clearing payment instrument image associated with the original payment instrument image in a user interface in response to receiving the original payment instrument image, the clearing payment instrument image associated with a first value of an image property; receiving an indication of an area of the clearing payment instrument image to update from the user interface; receiving an indication of a second value of the image property from the user interface to which to update the indicated area of clearing payment instrument image, the second value different than the first value of the image property; and updating the image property of the indicated area to the second value in response to receiving the indications of the area and the second value of the image property.

In another general aspect, an example method includes updating an image property of an area of a clearing payment instrument image associated with a tangible payment instrument including a payee, a payor, an amount, and an authorization, the tangible payment instrument to be submitted for electronic transaction clearing, wherein the image property of the area is updated to a second value different than a first value of the image property associated with a rejected clearing payment image that is unsuitable for electronic transaction clearing, and the area of the clearing payment instrument image includes less than the entire clearing payment image; and storing the updated clearing payment instrument image in response to updating the image property.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

The present disclosure involves systems, software, and computer-implemented methods for allowing independent adjustment of different areas of a payment instrument image.

Generally, a bank receiving physical payment instruments for deposit scans the payment instruments to produce original payment instrument images corresponding to the physical payment instruments. Payment instruments, in general, are non-cash instruments for exchanging value from one party to another, such as, for example, checks, cashier's checks, deposit slips, traveler's checks, or other instruments. These images are processed to produce payment instrument images suitable for use in the clearing process (clearing payment instrument images), which are then submitted to an appropriate financial institution for clearing. In some cases, the original payment instrument images may be monochromatc images (e.g., grayscale), color images, or other types of images, while the clearing payment instrument images may be monochromatic images, bi-tonal (e.g., black and white) images, reduced color images, or other types of images.

In some cases, a clearing payment instrument image may not capture all the necessary information on the check. For example, if the check includes a background or watermark image with multiple light and dark regions, the produced clearing image may include regions of low contrast, making it unsuitable for electronic processing.

The present disclosure describes techniques allowing independent adjustment of different areas of a payment instrument image. One example method includes identifying an original payment instrument image, such as a grayscale image, associated with a tangible payment instrument. A clearing payment instrument image based on the original payment instrument image is then created, such as by converting a grayscale image to a bi-tonal image. The clearing payment instrument image associated with a first value for a particular image property. An indication of an area of the clearing payment instrument image to adjust is received. A second value for the image property different than the first value may then be determined, and the image property of the area of the clearing payment instrument image is updated based on the second value of the image property. In some cases, the indications may be received by a user interface, which may limit the modifications a user may perform on the clearing payment instrument image, such as not allowing the user to update image properties besides contrast.

Figure 1:
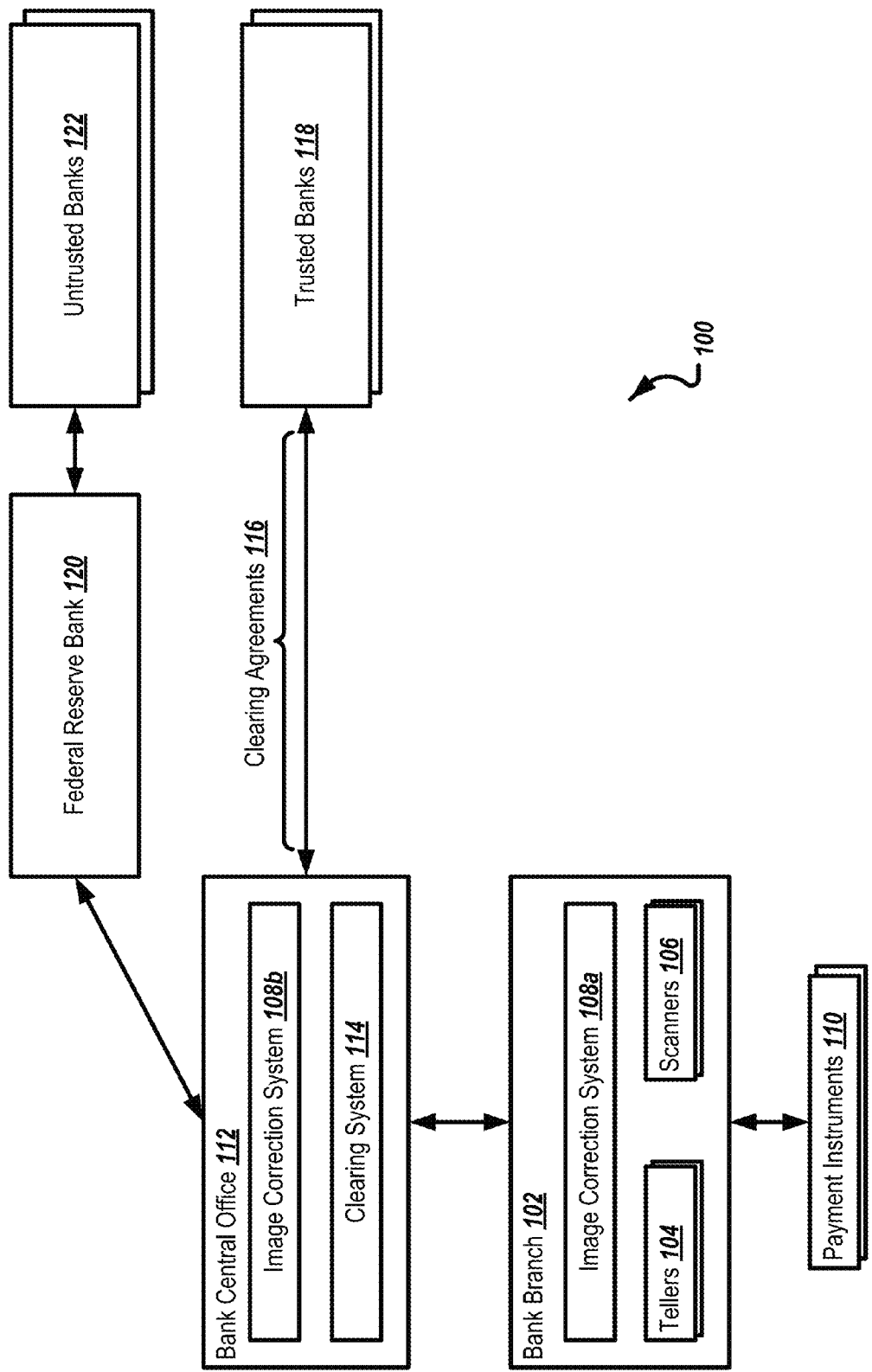
FIG. 1 is a block diagram illustrating an example system for clearing financial transactions between banks.

Implementations according to the present disclosure may provide several advantages over prior techniques. Allowing different areas of a payment instrument image to be adjusted independently may enable electronic processing of checks that previously necessitated physical processing. Because such processing is punitively expensive, the present techniques may lead to cost savings. Further, by limiting users to only adjusting certain property of the payment instrument image areas, potential fraud arising from user manipulation of check information may be avoided. Moreover, the present techniques may be performed proactively to correct low quality payment instrument images before they are submitted for clearing. In this way, costs and delays related to rejected payment instrument images may be reduced. In addition, the present techniques may result in a reduction in 'float' time of payments associated with the processed payment instrument images, which may reduce the potential of a payment not being cleared within the allowable time window as specified by the banking regulations. Such late payments may have to be written off by the depositing bank FIG. 1 is a block diagram illustrating an example environment 100 for clearing financial transactions between banks. In operation, one or more payment instruments 110 may be received at the bank branch 102, such as from bank customers seeking to deposit the payment instruments 110 into their respective accounts. The payment instruments 110 may be scanned by one or more scanners 106 to produce a set of associated payment instrument images. The payment instrument images may be sent by the bank branch 102 to the bank central office 112, which may be processed by the clearing system 114. For payment instrument images associated with checks drawn on banks with which the bank central office 112 has a clearing agreement 116 (e.g., trusted banks 122), the clearing system 114 may send the payment instrument images to the other bank for clearing. For payment instrument images associated with checks drawn on banks with which the bank central office 112 does not have a clearing agreement 116 (e.g., an trusted banks 122), the clearing system 114 may send the payment instrument images to a Federal Reserve Bank 120 for clearing. Image correction systems 108a-b, located at bank branch 102 and bank central office 112, respectively, may be used to correct payment instrument images either before the clearing process, or after a particular payment instrument image has been rejected during the clearing process, such as by the Federal Reserve Bank 120 or one of the trusted banks 118. More detail on the image correction systems 108a-b is provided below relative to FIGS. 2-5.

As shown, environment 100 includes a bank branch 102. The bank branch 102 may be a physical location associated with particular financial institution. In some cases, the particular financial institution may operate multiple bank branches at different locations. In some implementations, the bank branch 102 may be a virtual bank branch, such as a banking website, or an automated kiosk such as an automated teller machine (ATM). For the purposes of the present example, the bank branch 102 will be described as a physical branch location.

The bank branch 102 may include one or more tellers 104. In some cases, the tellers 104 may be stations within the bank branch 102 for processing deposits, withdrawals, and other financial transactions. The tellers 104 may be customer service employees of the bank branch 102 trained to operate the scanners 106, the image correction system 108a, or other systems. In some cases, the tellers 104 may be ATMs, and the scanners 106 or the image correction system 108a may be integrated into the tellers 104.

The tellers 104 process payment instruments 110 presented by bank customers at the bank branch 102. In some cases, the payment instruments 110 may include bank drafts, cashier's checks, money orders, deposit slips, bearer notes, traveler's checks, or other types of financial instruments. The payment instruments 110 may also be presented to the bank branch 102 electronically, such as in the form of payment instrument images.

The payment instruments 110 may be scanned by one or more scanners 106 to produce payment instrument images. In some implementations, the scanners 106 may be multi feed check scanners operable to produce grayscale or other monochromatic images associated with each check. The scanners 106 may also perform analysis on the payment instrument images, such as, for example, optical character recognition (OCR), magnetic ink character recognition (MICR), image filtering, contrast adjustment, despeckling, and other analysis. In some implementations, external hardware or software systems may interface with the scanners 106 in order to perform image analysis on the payment instrument images.

In some cases, the scanners 106 may scan one or more of the payment instruments 110, and package the associated payment instrument images and extracted metadata from the checks (e.g., OCR or MICR data) into a cash letter file. In some cases, the cash letter file may be formatted according to X9.37, X9.180, X9.187, or another standard.

The bank branch 102 also includes a image correction system 108a. In operation, the image correction system 108a allows an analyst to review payment instrument images and make adjustments to different areas of the payment instrument image independently from other areas. The operation of the image correction system 108a is described in greater detail below. In some implementations, the image correction system 108a may be used to proactively review payment instrument images at the bank branch 102A before they are sent to the bank central office 112 for clearing. For example, the image correction system 108a may take a cash letter file including monochromatic and bi-tonal payment instrument images as input, and allow an analyst to iterate through each image in the cash letter file to determine whether corrections need to be made, and to allow the analyst to make such corrections.

The environment 100 also includes a bank central office 112. In some cases, the bank central office 112 may be a regional or national office of the financial institution associated with the bank branch 102. The bank central office 112 may receive payment instrument images from multiple bank branches associated with the financial institution for clearing.

As shown, the bank central office 112 includes a clearing system 114. In operation, the clearing system 114 may examine receive payment instrument images and associated metadata to determine how to clear transactions associated with the payment instrument images. For example, the clearing system 114 may determine that a particular payment instrument image is associated with a trusted bank 118. The clearing system 114 may send the payment instrument image, the metadata associated with payment instrument image, or other information to the trusted bank 118 to clear the transaction associated with the payment instrument image. This interaction between the bank central office 112 and the trusted bank 118 may be governed by a clearing agreement 116 between the financial institutions associated with the bank central office 112 and the trusted bank 118. Such a clearing agreement 116 may define the terms by which transactions between the two institutions may be cleared.

The clearing system 114 may also send payment instrument images and associated metadata through the Federal Reserve Bank 120 for clearing. In such a case, the Federal Reserve Bank 120 brokers the transaction clearing between the bank central office 112 and the un-trusted bank 122 associated with particular payment instrument image. In some cases, the bank central office 112 may attempt to clear payment instrument images directly with one of the un-trusted banks 122, such as in cases where clearing the check to the Federal Reserve Bank 120 is not cost-effective.

As shown, the bank central office 112 includes a image correction system 108b. In operation, the image correction system 108b allows an analyst to review payment instrument images and make adjustments to different areas of the payment instrument image independently from other areas. The operation of the image correction system 108b is described in greater detail below. In some implementations, the image correction system 108a may be used to proactively review payment instrument images at the bank central office 112 before they are sent to the trusted banks 118, the Federal Reserve Bank 120, or the un-trusted banks 122 for clearing. For example, the image correction system 108b may take a cash letter file including monochromatic and bi-tonal payment instrument images as input, and allow an analyst to iterate through each image in the cash letter file to determine whether corrections need to be made, and to allow the analyst to make such corrections. The image correction system 108b may also allow an analyst to review and correct one or more payment instrument images in response to a payment instrument image or a batch of payment instrument images being rejected by the trusted bank 118, the Federal Reserve Bank 120, or an untrusted bank 122.

In FIG. 1 and the above description, interactions between the bank branch 102, the bank central office 112, the trusted banks 118, the Federal Reserve Bank 120, and the un-trusted banks 122 may occur over communications networks connecting these components. In some implementations, the communications may be encrypted. In some cases, the payment instrument images and associated metadata sent between the different components may be included in cash letter files sent over the communications networks between the components. In some cases, the cash letter file may be formatted according to X9.37, X9.180, X9.187, or another standard. In some implementations, the physical payment instruments 110 may be exchanged between the components at different points in the transaction clearing process. In some cases, the physical payment instruments 110 may not be exchanged, and may be archived at the bank branch 102, and/or the bank central office 112.

Figure 2:
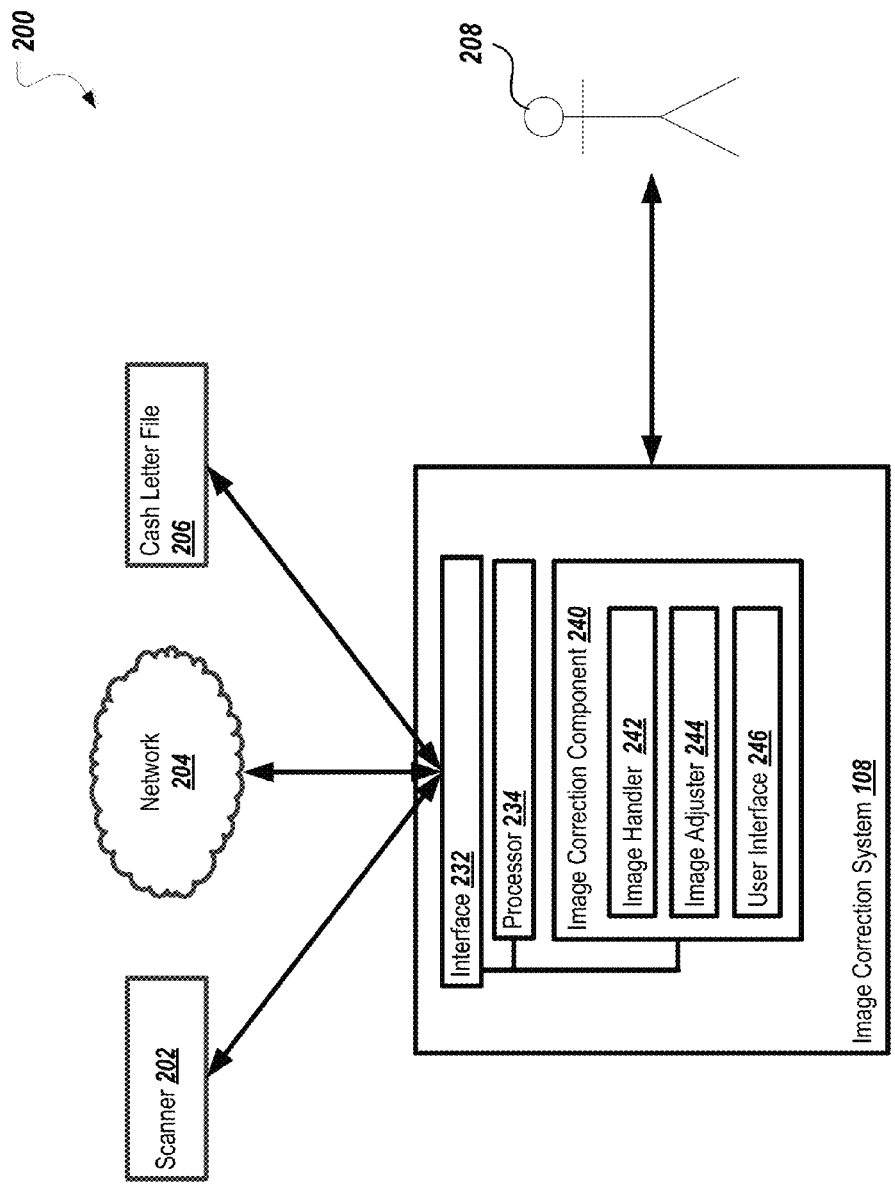
FIG. 2 is a block diagram illustrating an example system for allowing independent adjustment for different areas of a payment instrument image.

FIG. 2 is a block diagram illustrating an example system 200 for allowing independent adjustment of different areas of a payment instrument image. The system 200 includes a image correction system 108, also shown in FIG. 1 as 108a-b. The image correction system 108 includes an interface 232 which is operable to receive payment instrument image information from the scanner 202, a network 204, a cash letter file 206, or other sources. The processor 234 executes the image correction component 240. In operation, the image correction component 240 allows a user 208 to examine a payment instrument image, select areas of the payment instrument image to adjust, to perform an adjustment on the selected areas, and the output the corrected image.

As shown, the system 200 includes a scanner 202. In some implementations, the scanner 202 may be a multi-feed check scanner connected to the image correction system 108. The image correction system 108 may control the scanner 202 by sending it various commands over the interface 232, such as a command instructing the scanner 202 to begin scanning. The scanner 202 may send acquired images to the image correction system 108 via the interface 232. In some implementations, the scanner 202 is connected to the interface 232 via universal serial bus (USB) connection. The scanner 202 may also be connected to the image correction system 108 using other technologies, including, but not limited to, Ethernet, RS-232, IEEE 1394, Peripheral Component Interconnect (PCI), Small Computer System Interface (SCSI), or other interconnection technologies. The scanner 202 may also communicate with the image correction system 108 over a communications network, such as an Internet Protocol (IP) network.

In some cases, the scanner 202 is a multifeed check scanner operable to process multiple physical documents in a batch. The scanner 202 may include a feeder mechanism to draw physical documents from the batch one at a time into position for image capture. Capturing images may be performed according to known techniques. In some cases, the scanner 202 may include image processing functionality to improve the quality of the captured image, such as by reducing noise, despeckling, sharpening, adjusting contrast, or performing other processing. The scanner 202 may also perform data extraction, such as, for example, OCR, MICR, or other processes. For example, the scanner 202 may read a routing number and account number printed in MICR ink on the physical document, and may perform OCR on a handwritten amount on the physical document. In some cases, the scanner 202 may scan multiple physical documents and produce a cash letter file containing images and extracted metadata associated with the physical documents.

The system 200 also includes a network 204. In some cases, the image correction system 108 may be operable to interact with the network 204 to obtain one or more payment instrument images. For example, if a particular batch of payment instrument images has been rejected as low-quality, and the original monochromatic images of the checks are not available, the image correction system 108 may send a request over the network to a location storing the monochromatic images to retrieve them for further processing. In some cases, the image correction system 108 may receive payment instrument images for review in the form of cash letter files.

System 200 also includes a cash letter file 206. In some cases, the image correction system 108 may be provided with a particular cash letter file 206 for processing. For example, the cash letter file 206 may be loaded into the image correction system 108, such as by storing the cash letter file 206 on a disk included in the image correction system 108 (not shown), and opening the cash letter file 206 with the image correction component 240.

The image correction system 108 may be a computing device or set of computing devices operable to receive payment instrument images and allow independent adjustment of different areas of the images. In some implementations, the image correction system 108 may be a computing device executing one or more software programs to perform these actions. The image correction system 108 may include an operating system for controlling its execution and operation, including, but not limited to, MICROSOFT WINDOWS, LINUX, APPLE OS X, APPLE IOS, ANDROID, UNIX, BSD, or other operating systems. The image correction system 108 may also include other standard computing components, such as, for example, one or more memories, one or more input devices such as keyboards, mice, touch screens, or other devices, one or more output devices such as displays, speakers, or other devices, or other computing components.

As shown, the image correction system 108 includes an interface 232. The interface 132 is used by the image correction system 108 for communicating with other components, such as the scanner 202, the network 204, and a data location for the cash letter file 206. Generally, the interface 132 comprises logic encoded in software and/or hardware in a suitable combination and operable to communicate with these components. More specifically, the interface 132 may comprise software supporting one or more communication protocols associated with the components allowing information to be exchanged between the image correction system 108 and the components.

The image correction system 108 includes a processor 234. Although illustrated as a single processor 234 in FIG. 2, two or more processors may be used according to particular needs, desires, or particular implementations of environment 100. Each processor 234 may be a central processing unit (CPU), a blade, an application specific integrated circuit (ASIC), a field-programmable gate array (FPGA), a graphics processing unit (GPU) or another suitable component. Generally, the processor 234 executes instructions and manipulates data to perform the operations of the image correction system 130.

The image correction system 108 includes a image correction component 240. In some implementations, the image correction component 240 is a software application operable to acquire and present payment instrument images to the user 208, and allow the user to adjust of different areas of the payment instrument images independently from one another.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, JAVA, VISUAL, assembler, PERL, PYTHON, any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The image correction component 240 includes a image handler 242. In operation, the image handler 242 may receive or extract payment instrument images from the various components, and perform various processing and/or analysis operations on the images. For example, the image handler 242 may perform initial adjustments to a monochromatic payment instrument image to produce the corresponding bi-tonal image to present to the user 208 through the user interface 246. The image handler 242 may enhance, despeckle, sharpen, adjust contrast, or perform other operations on a particular payment instrument image. In some cases, the image handler 242 may extract information from the payment instrument image, such as by performing MICR or OCR processing to extract payment details from the payment instrument image. As previously discussed, this analysis may be performed elsewhere, such as in cases where the image correction system 108 is presented with the cash letter file including this information. The image handler 242 may also be operable to control the scanner 202 to obtain payment instrument images of physical documents, such as by issuing commands to control the operation of the scanner 202.

The image correction component 240 includes an image adjuster 244. In operation, the image adjuster 244 performs adjustments to an original payment instrument image to produce a clearing payment instrument image. In some implementations, the image adjuster 244 applies a filter to a monochromatic payment instrument image to produce a corresponding bi-tonal payment instrument image. For example, the image adjuster 244 may examine the monochromatic payment instrument image, and produce a bi-tonal payment instrument image where every pixel corresponding to a pixel of the monochromatic payment instrument image with an intensity greater than a desired contrast value is set to black, and all of the pixels are set to white. By adjusting this desired contrast value, different bi-tonal image representations of the monochromatic payment instrument image can be produced. In some cases, the image adjuster 244 is controlled by the user interface 246, such as by the slider component shown in FIGS. 3-5 and discussed below. In such cases, the image adjuster 244 may produce a new bi-tonal image each time the state of the slider component changes, such that the user interface 246 provides the user with an updated bi-tonal image based on their current contrast value selection. In some implementations, the image adjuster 244 may also allow other adjustments, including, but not limited to, color weighting, noise reduction, despeckling, or other adjustments.

The image correction component 240 includes a user interface 246. In operation, the user interface 246 may present the user with payment instrument images and associated metadata for analysis, allow adjustment of the payment instrument images, or perform other actions. The user interface 246 may be visual interface presented to the user 208 over a display associated with the image correction system 108 (not shown). The user interface 246 may include standard visual computing components, such as buttons, text boxes, sliders, combo boxes, or other components. Examples of the user interface 246 are described in greater detail relative to FIGS. 3-5.

Figure 3:
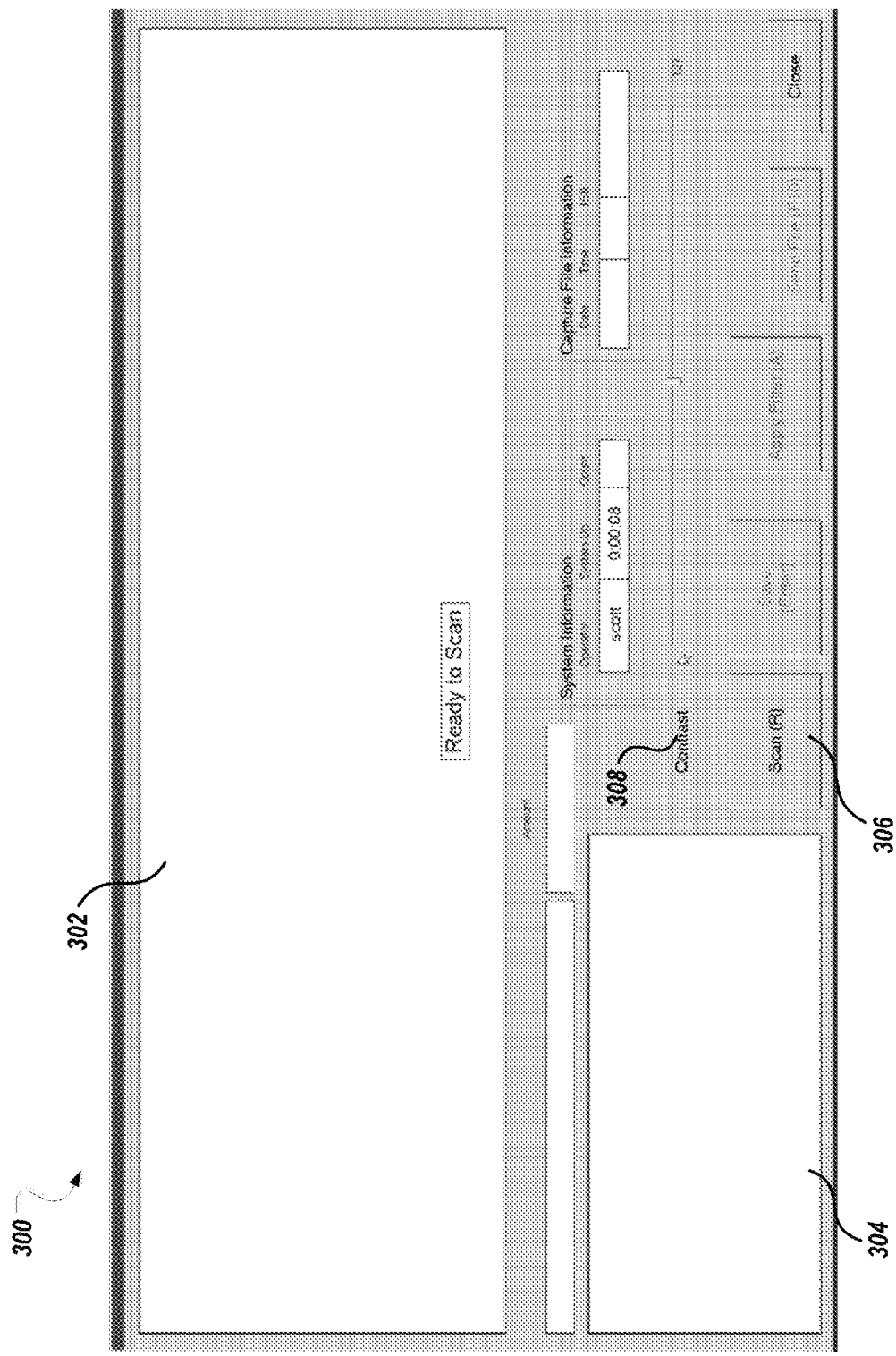
FIG. 3 is a diagram illustrating an example user interface to an example image correction system in an initial state.

FIG. 3 is a diagram illustrating an example user interface 300 to an example image correction system in an initial state. The user interface 300 includes a bi-tonal image pane 302, and a monochromatic image display pane 304. The display panes 302 and 304 are populated with images of the check upon scanning, as shown in the subsequent figures. The user interface 300 also includes a scan button 306 that will initiate the check scanning process when actuated. In some cases, actuating the scan button 306 causes the image correction component 240 of FIG. 2 to interact with the scanner 202 to acquire one or more payment instrument images. The user interface 300 also includes a contrast slider 308 used to adjust the contrast of a bi-tonal image displayed in the bi-tonal image pane 302. Operation of this component is described in more detail below.

Figure 4:
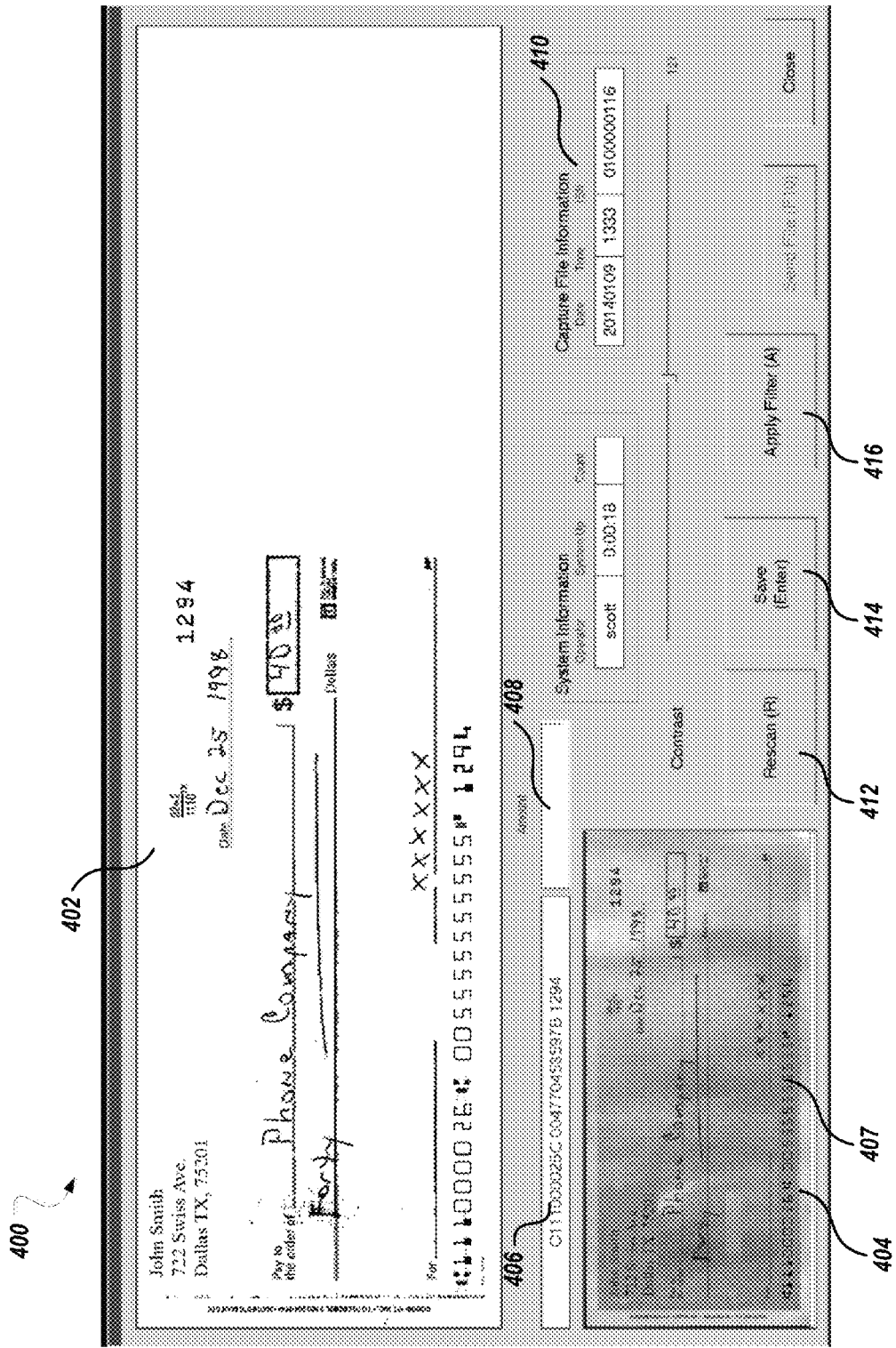
FIG. 4 is a diagram illustrating the example user interface after a physical check has been scanned.

FIG. 4 is a diagram illustrating an example user interface 400 after a physical check has been scanned. As shown, a bi-tonal (black-and-white) payment instrument image 402 is displayed in the upper display pane, and a corresponding monochromatic (grayscale) payment instrument image 404 is displayed in the lower display pane. Account information text box 406 displays the parsed account information extracted from the MICR line 407 that the bottom of the monochromatic payment instrument image 404. In some implementations, the account information text box 406 may be populated by metadata included in a cash letter file for the particular payment instrument image, or may be populated based on MICR analysis performed locally. Amount text box 408 may similarly include an amount value populated by metadata included in a cash letter file for the particular payment instrument image, or may be populated based on OCR analysis of the payment instrument image performed locally.

The user interface 400 includes a rescan button 412 that may cause an associated scanner to repeat the previous image capture. The user interface 400 also includes a save button 414 that can be pressed by a user to save any changes made to the payment instrument image or the associated metadata to the associated cash letter file. The user interface 400 also includes an apply filter button 416 that will apply a predetermined filtering operation to the bi-tonal payment instrument image 402. In some implementations, the predetermined filtering operation may include sharpening, enhancing, despeckling, adjusting contrast, or other operations.

Figure 5A:
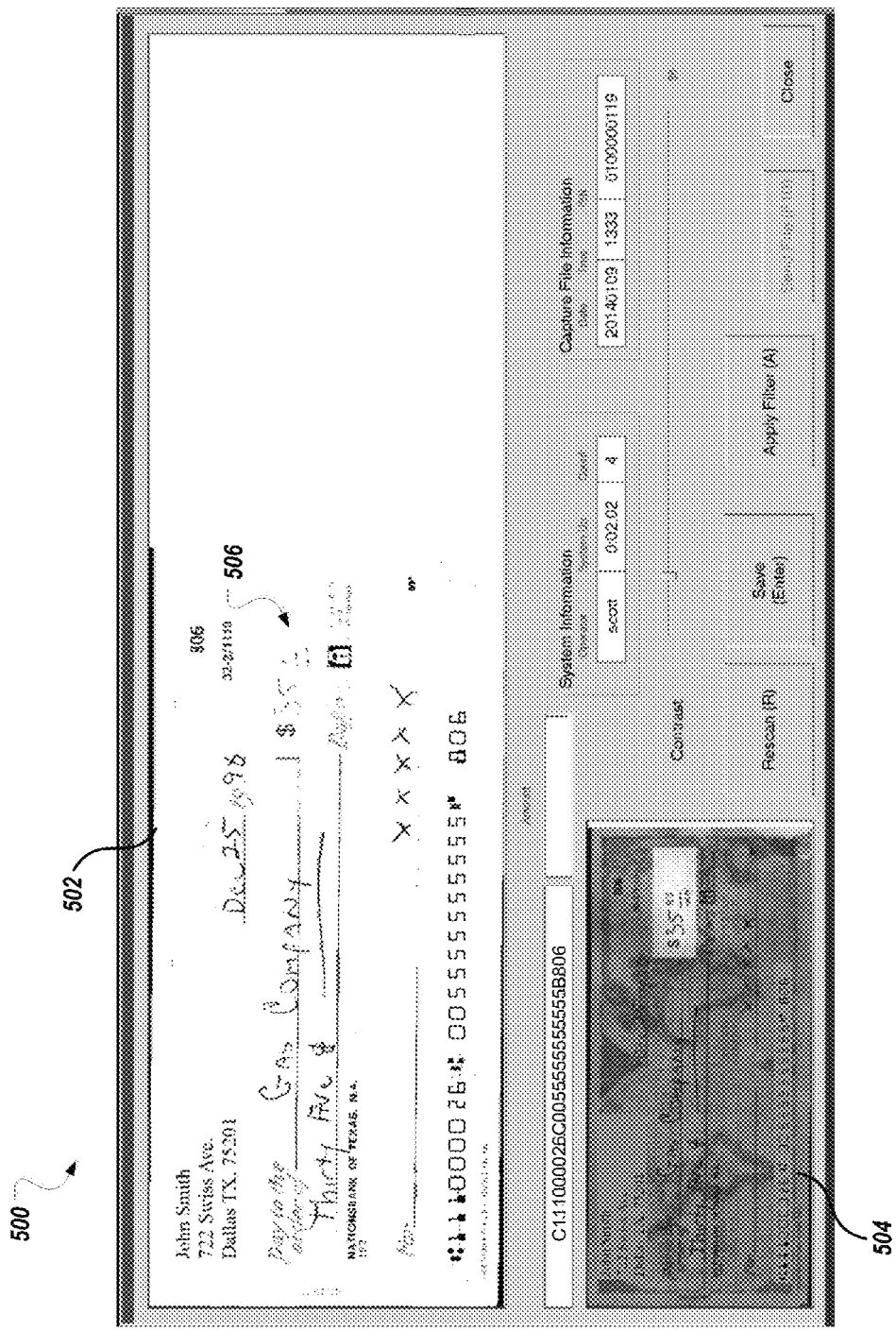
FIG. 5A is a diagram illustrating the example user interface after a physical check with a low contrast region has been scanned.

FIG. 5A is a diagram illustrating the example user interface 500 after a physical check with a low contrast region 506 has been scanned. As shown, the user interface 500 presents a bi-tonal payment instrument image 502, and the monochromatic payment instrument image 504. The monochromatic payment instrument image 504 includes a light region around the amount, while the remainder of the image is predominantly dark. Accordingly, the corresponding bi-tonal payment instrument image 502 includes a low contrast region 506 corresponding to this light region of the monochromatic payment instrument image 504. In creating the bi-tonal payment instrument image 502, the system chooses a contrast value based on the entire monochromatic payment instrument image 504. Because the remainder of the monochromatic payment instrument image 504 is predominantly dark, the contrast value chosen by the system is high, causing the text within the low contrast region 506 to not be legible. Adjusting the contrast value for the entire bi-tonal image may not alleviate the problem, because by lowering the contrast value, more of the background pattern of the monochromatic payment instrument image 504 will be included as black in the bi-tonal payment instrument image 502, which may obscure other details of the check.

Figure 5B:
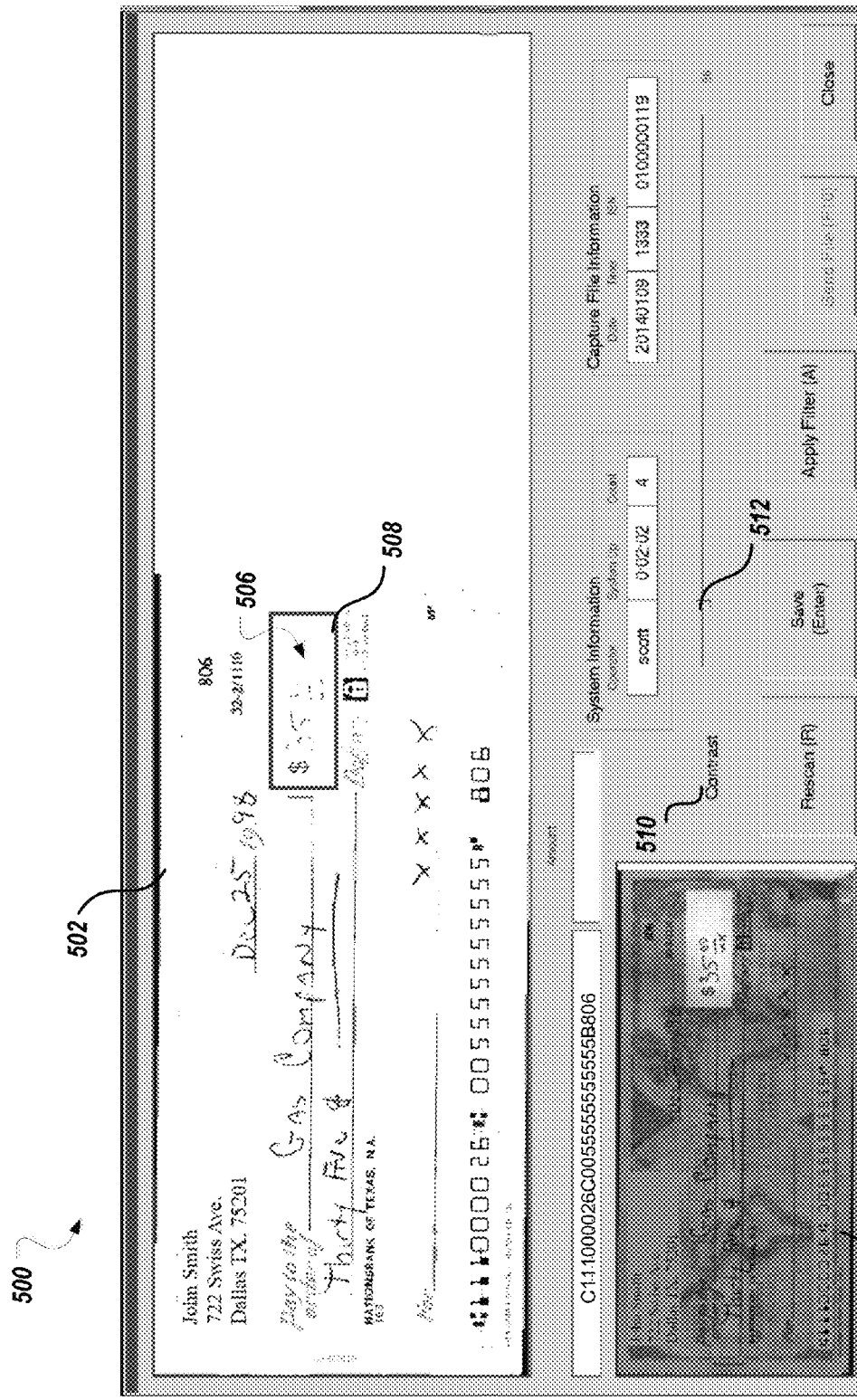
FIG. 5B is a diagram illustrating the example user interface receiving an indication of an area to which to apply a contrast adjustment.

FIG. 5B is a diagram illustrating the example user interface 500 receiving an indication of an area to which to apply a contrast adjustment. As shown, a box 508 has been placed around the low contrast region 506 to indicate that contrast should be adjusted. In some implementations, the user may indicate an area to adjust by clicking and dragging a mouse to make a box or rectangle around the area. In some cases, the indication may be a different shape, such as, for example, a circle, an oval, a square, a triangle, or other shapes. The user interface 500 may also allow the user to draw a freeform shape. In some cases, the user interface 500 may allow the user to indicate multiple areas of the bi-tonal payment instrument image 502 to adjust simultaneously.

The user interface 500 includes a contrast adjustment slider 510 by which a user may indicate adjustments to the contrast of the area of the bi-tonal payment instrument image 502 selected by the box 508. The contrast adjustment slider 510 is shown in a first position 512. In some implementations, the contrast adjustment slider 510 may be a different type of user interface component decides a slider, such as, for example, a text box, a drop-down list, a set of radio buttons, or other user interface components.

Figure 5C:
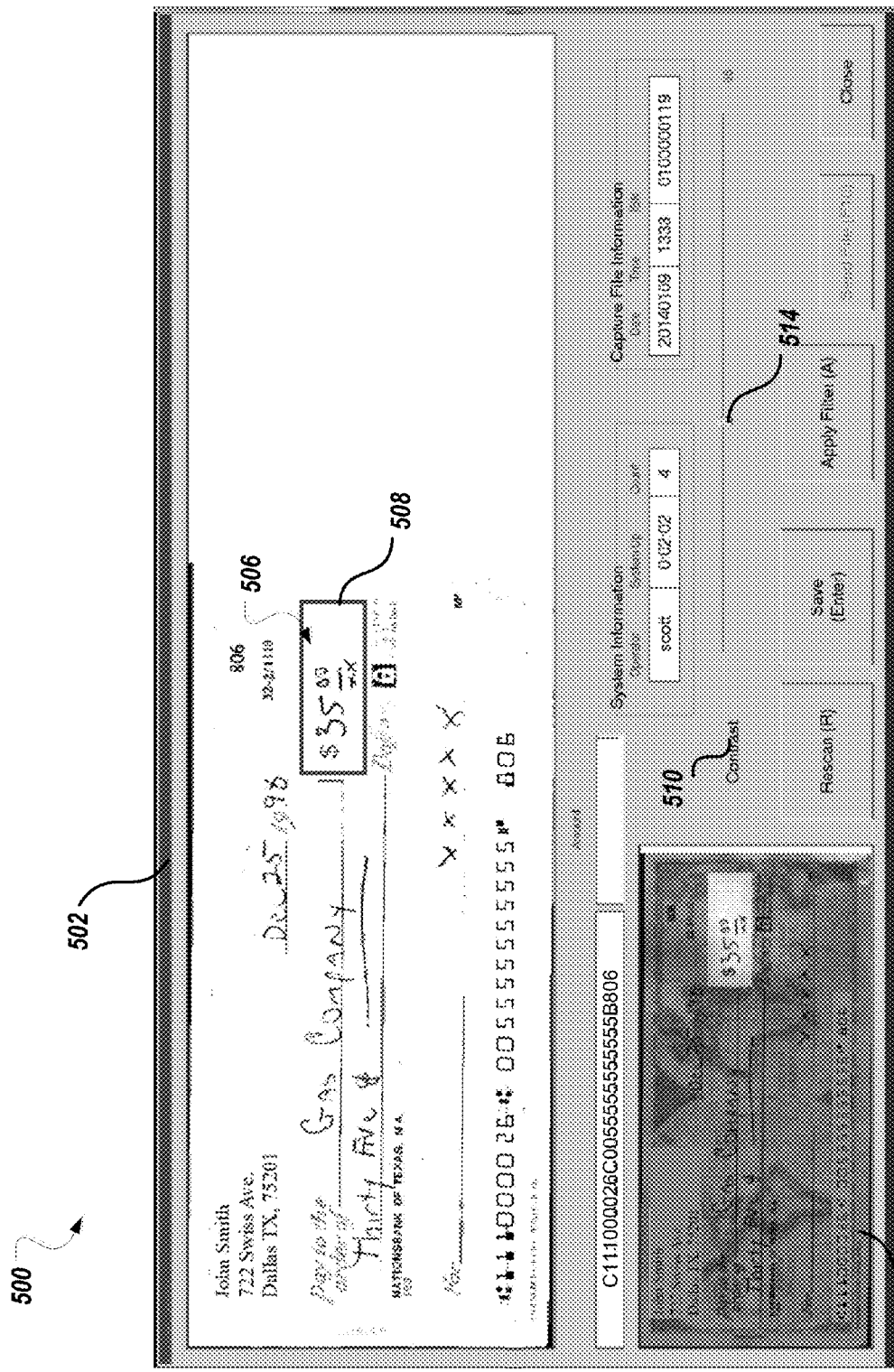
FIG. 5C is a diagram illustrating the example user interface after performing the contrast adjustment to the indicated area.

FIG. 5C is a diagram illustrating the example user interface 500 after performing the contrast adjustment. As shown, the contrast adjustment slider 510 has been moved to a second position 514. In response, the contrast value of the area selected by the box 508 has been decreased, such that more pixels within the box 508 are interpreted as black. Accordingly, the amount within the low contrast region 506 ("$35.00") is now legible. In some cases, the low contrast region 506 may be analyzed to verify that it is in fact legible, such as by performing OCR processing or by using other techniques. Such a determination of legibility may be based on standards of legibility defined by the Federal Reserve, the banking industry, a particular financial institution (e.g., the financial institution associated with the check), or other entities.

Although the preceding figures describe example implementations involving performing contrast adjustments on areas of bi-tonal images created from monochromatic images, the present disclosure is not limited to this type of adjustment, and contemplates performing various adjustments on various types of images. In some implementations, the original payment instrument image may be a color image, and the clearing payment instrument image may be a grayscale image. In such a case, the user interface may allow the user to adjust weighting values associated with the red, green and blue values of each pixel when creating the grayscale image. For example, if a certain pixel had a red intensity of 10, a blue intensity of 11, and a green intensity of 0, and all three colors were weighted evenly, the corresponding pixel in the grayscale image would have an intensity value of 7, calculated by averaging the three color intensities. If the same pixel had an associated red weight of 0%, the intensity of the grayscale pixel would be based only on the blue and green intensities, yielding grayscale intensity of approximately 3.67 (11/3). In this way, certain colors may be filtered from the corresponding grayscale image by reducing their weights. Such a feature may be useful for original payment instrument images including background patterns of a certain color. The user interface may allow access to such a feature by presenting the user with three sliders similar to the contrast adjustment slider 510, with each slider controlling a weighting value of a single color. Indicated areas of the clearing payment instrument image may be updated using these sliders in the same manner described above relative to the contrast adjustment slider 510.

In some implementations, the original payment instrument image may be a color image, and the clearing payment instrument image may be a black and white image. In such a case, the user interface may allow the user to adjust the weighting values associated with the red, green and blue values of each pixel as described above, and may also allow the user to adjust the contrast value used when creating the black and white image. The color intensities of a pixel may be averaged as described above to yield a gray intensity, and then the contrast value may be applied to determine if the corresponding pixel in the clearing image should be white or black, similar to the process described above. In such an implementation, the user interface may include four sliders, one for each color and one for the contrast value.

As described above, these techniques may be used to include information in a clearing payment instrument image that would be lost using a global contrast adjustment. For example, in a case where the MICR line of a check has been written over in black marker, there may be a slight difference in the color of the MICR line and the black marker, such that a contrast adjustment may make the MICR line visible in the black and white clearing payment instrument image. In another example, a selective contrast adjustment may allow a highlighted piece of information on the image, such as the address, to be included in the black and white clearing payment instrument image, whereas before it may have appeared as black.

Figure 6:
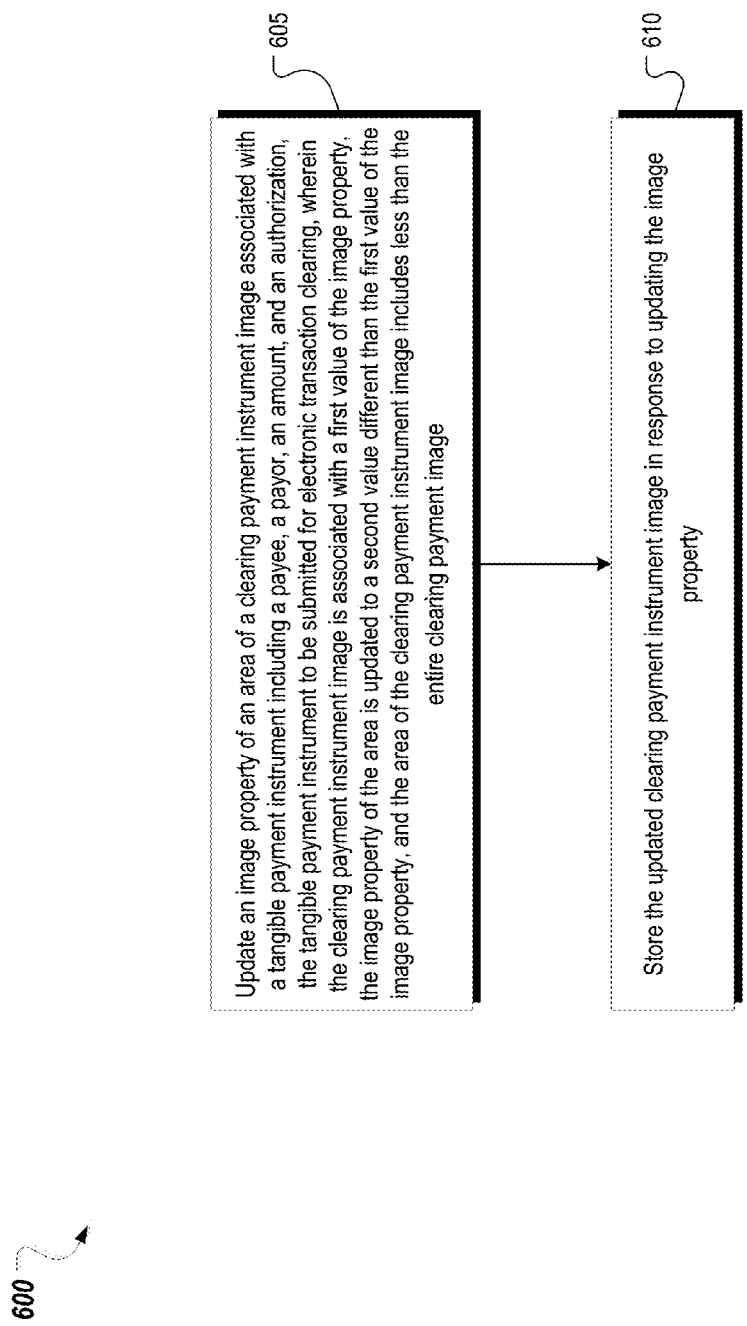
FIG. 6 is flow chart showing an example method for allowing independent adjustment of different areas of a payment instrument image.

FIG. 6 is flow chart showing an example method for allowing independent adjustment of different areas of a payment instrument image. For clarity of presentation, the description that follows generally describes method 600 in the context of FIGS. 1-5. However, method 600 may be performed, for example, by any other suitable system, environment, software, and hardware, or a combination of systems, environments, software, and hardware, as appropriate.

At 605, an image property of an area of the clearing payment instrument image associated with a tangible payment instrument is updated. The tangible payment instrument includes a payee, a payor, an amount, and authorization. In some cases, the tangible payment instrument is to be submitted for electronic transaction clearing. The tangible payment instrument may include at least one of a payment instrument, a money order, a cashier's check, or a deposit slip. The clearing payment instrument image is associated with a first value of the image property, and the image property of the area is updated to a second value different than the first value of the image property. The area of the clearing payment instrument image includes less than the entire clearing payment image.

At 610, the updated clearing payment instrument image is stored in response to updating the image property. In some implementations, storing the updated clearing payment instrument image includes inserting the updated clearing payment instrument image into a cash letter file.

In some cases, the clearing payment instrument image is created based on an original payment instrument image associated with the tangible payment instrument prior to updating the image property. The clearing payment instrument image may also be received from an external location prior to updating the image property.

In some implementations, the original payment instrument image is identified prior to creating the clearing payment instrument image. Identifying the original payment instrument image may include scanning the tangible payment instrument with an image scanner, identifying the original payment instrument image within a cash letter file, receiving the original payment instrument image over a network in response to a request, or other actions.

In some cases, identifying the original payment instrument image includes identifying a monochromatic payment instrument image, and creating the clearing payment instrument image includes creating a bi-tonal payment instrument image. In some implementations, the monochromatic payment instrument image is a grayscale payment instrument image, the bi-tonal payment instrument image is a black-and-white payment instrument image, and the image property includes contrast.

In some implementations, identifying the original payment instrument image includes identifying a color payment instrument image, and the image property includes a red weight value, a green weight value, and a blue weight value. In such cases, creating the clearing payment instrument image from the original payment instrument image may include creating a grayscale payment instrument image from the color payment instrument image based at least in part on the red weight value, the green weight value, and the blue weight value, and updating the image property of the area of the clearing payment instrument image may include updating at least one of the red weight value, the green weight value, or the blue weight value for the area.

The image property may also include a contrast threshold value, and creating the clearing payment instrument image from the original payment instrument image may include creating a black-and-white payment instrument image from the color payment instrument image based at least in part on the red weight value, the green weight value, the blue weight value, and the contrast threshold value, and updating the image property of the area of the clearing payment instrument image may include updating at least one of the red weight value, the green weight value, the blue weight value, or the contrast threshold value for the area. In some cases, the contrast threshold value for each pixel may be stored in an alpha channel of the original payment instrument image, the clearing payment instrument image, or both images.

In some cases, the clearing payment instrument image may be a color image, and updating the image property may include adjusting color levels so that information from the tangible payment instrument (e.g., payor, payee, amount, etc.) is legible in the clearing payment instrument image.

In some implementations, the clearing payment instrument image is presented in a user interface in response to creating the clearing payment instrument image, an indication of the area of the clearing payment instrument image to adjust is received from the user interface, and an indication of the second value of the image property is received from the user interface. In some implementations, the user interface does not allow updating of image properties of the indicated area of the clearing payment instrument image other than the image property.

In some cases, updating the value of the area of the clearing payment instrument image to the second value includes determining that the updated area of the clearing payment instrument image is legible based at least in part on requirements of an electronic payment instrument clearing process.

In some implementations, identifying information is extracted from a first clearing payment instrument image, the second value of the image property and the area are associated with the identifying information from the first clearing payment instrument image. A determination is then made that a second original payment instrument image associated with a second tangible payment instrument different than the first tangible payment instrument includes the identifying information. The second clearing payment instrument image is updated based on the second original payment instrument image based on the second value of the image property and the area associated with the identifying information. In some cases, the identifying information includes an account number and a routing number.

Figure 7:
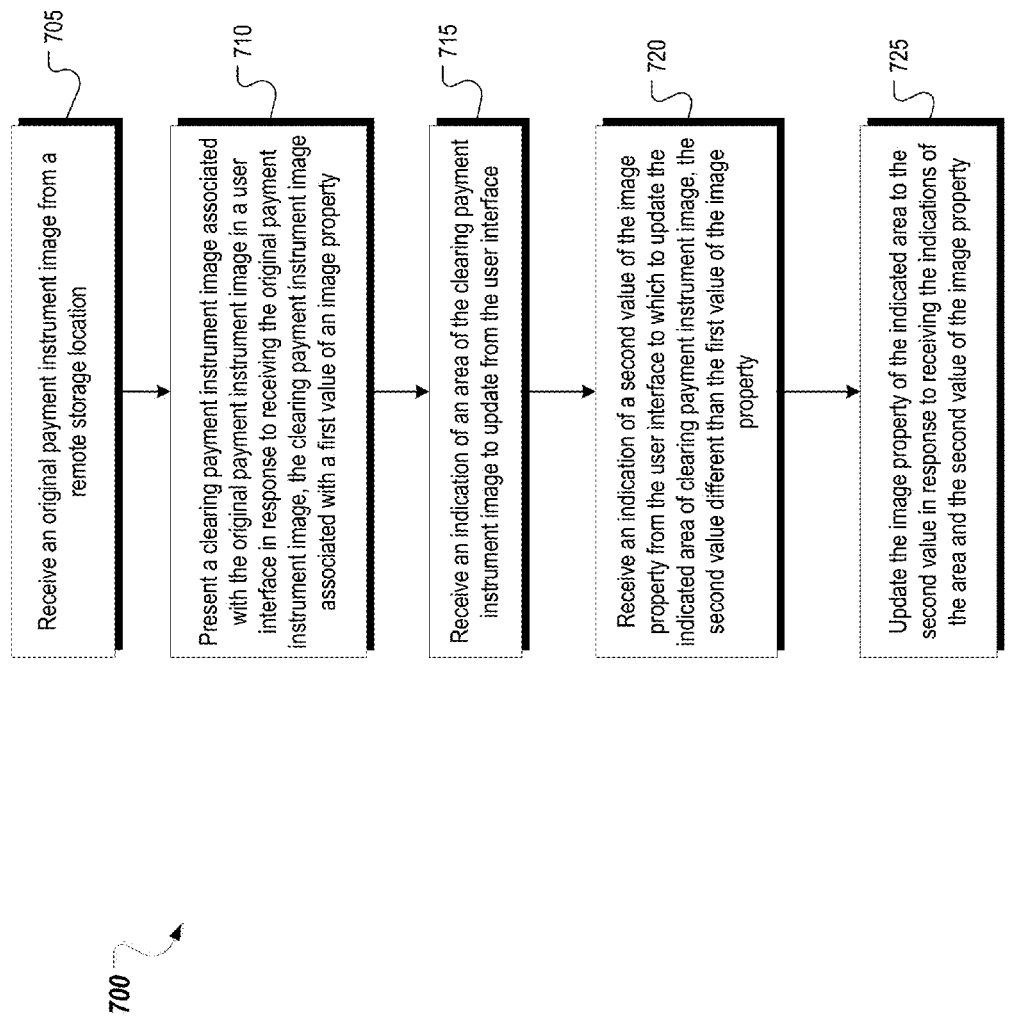
FIG. 7 is flow chart showing another example method for allowing independent adjustment of different areas of a payment instrument image.

FIG. 7 is flow chart showing an example method for allowing independent adjustment for different areas of a payment instrument image. For clarity of presentation, the description that follows generally describes method 700 in the context of FIGS. 1-5. However, method 700 may be performed, for example, by any other suitable system, environment, software, and hardware, or a combination of systems, environments, software, and hardware, as appropriate.

At 705, and original payment instrument image is received from a remote storage location. In some implementations, the original payment instrument image may be received at a user station. In some cases, the remote storage location is an archive storing one or more original payment instrument images. In some cases, the remote storage location is an image scanner, and the user station receiving the original payment instrument image includes receiving a scanned image of the tangible payment instrument. In some implementations, the tangible payment instrument includes at least one of a payment instrument, a money order, a cashier's check, or a deposit slip.

At 710, the clearing payment instrument image associated with the original payment instrument image is presented in a user interface in response to receiving the original payment instrument image. The clearing payment instrument image is associated with a first value of image property. In some cases, the image property is contrast. At 715, an indication of an area of the clearing payment instrument image to update is received from the user interface. At 720, an indication of a second value of the image property is received from the user interface, the second value indicating a value to which to update the indicated area. The second value may be different than the first value of the image property.

At 725, the image property of the indicated area is updated to the second value in response to receiving the indication of the area and the second value of the image property. In some cases, the user interface does not allow updating of image properties of the indicated area of the clearing payment instrument image other than the image property.

In some cases, the updated clearing payment instrument image may be stored in response to updating the image property of the indicated area. Storing the updated clearing payment instrument image may include inserting the updated clearing payment instrument image into a cash letter file.

In some implementations, updating the image property may be limited to avoid allowing the payment instrument image to be improperly manipulated. For example, in implementations where the image property is contrast, it may be possible to set the contrast value for an area to turn the entire area black. If adjustment of very small area of the payment instrument image is allowed, it may be possible for additional information to be introduced into the payment instrument image. For this reason, limitations on the adjustment parameters may be enforced. For example, contrast adjustment may be limited to not allow the contrast threshold for a region to be set low enough to turn the entire region black. Contrast adjustment may also be limited so that only regions over a certain size may be adjusted, thereby preventing the adjustment of small groups of pixels to modify the payment instrument image. Additionally, image adjustment behavior that may indicate fraud may be tagged for further review. For example, if an analyst spends greater than a certain amount of time adjusting a particular payment instrument image, the image may be flagged for further review. In another example, if an analyst performs more than a certain number of individual adjustments to the same payment instrument image, the image may be similarly flagged.

Figure 8:
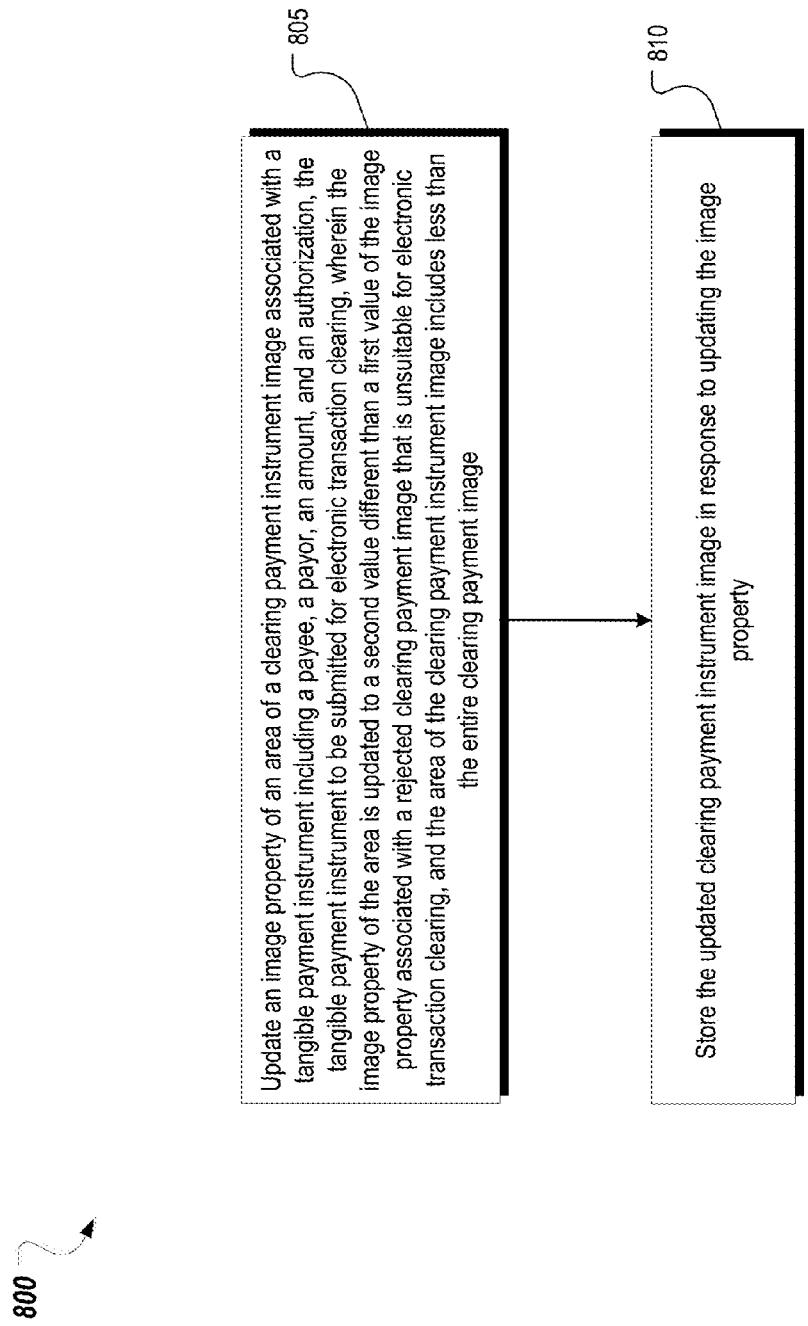
FIG. 8 is flow chart showing another example method for allowing independent adjustment of different areas of a payment instrument image.

FIG. 8 is flow chart showing an example method for allowing independent adjustment for different areas of a payment instrument image. For clarity of presentation, the description that follows generally describes method 800 in the context of FIGS. 1-5. However, method 800 may be performed, for example, by any other suitable system, environment, software, and hardware, or a combination of systems, environments, software, and hardware, as appropriate.

At 805, an image property of an area of the clearing payment image associated with a tangible payment instrument is updated, the tangible payment instrument including a payee, a payor, an amount, and an authorization. The image property of the area is updated to a second value different than a first value of the image property associated with a rejected clearing payment image that is unsuitable for electronic transaction clearing, and the area of the clearing payment instrument image includes less than the entire clearing payment image. In some cases, the rejected clearing payment image is associated with a rejection reason indicating why the rejected clearing payment image is unsuitable for electronic transaction clearing. The rejection reason may include one or more of a missing corner, image noise, image skew, darkness, or other reasons. The rejection reason may also include illegibility of at least one of the payee, the payor, the amount, the authorization, or other information. At 810, the updated clearing payment instrument image is stored in response to updating the image property.

Figure 9:
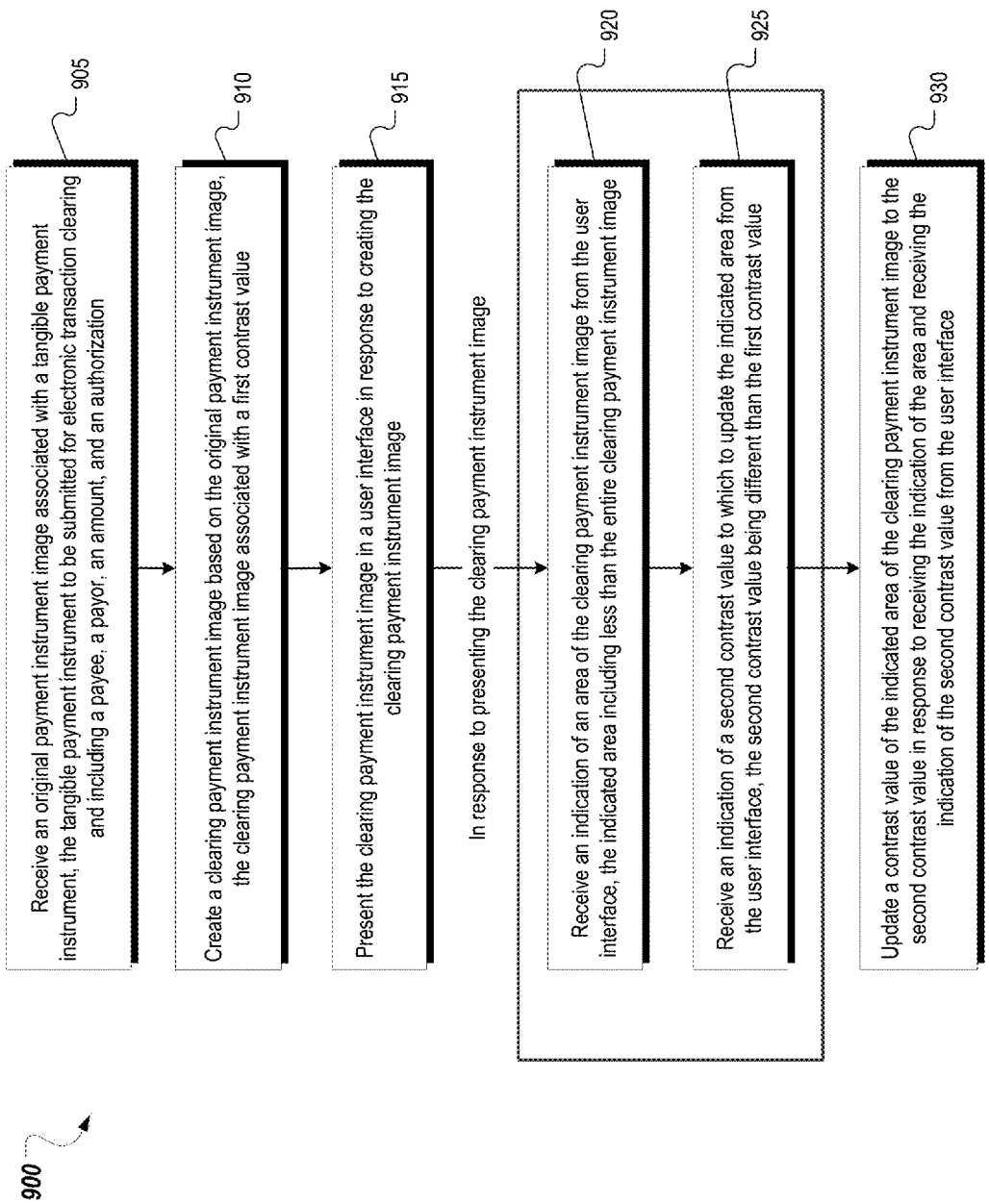
FIG. 9 is flow chart showing an example method for allowing independent contrast adjustment of different areas of a payment instrument image.

FIG. 9 is flow chart showing an example method for allowing independent contrast adjustment for different areas of a payment instrument image. For clarity of presentation, the description that follows generally describes method 900 in the context of FIGS. 1-5. However, method 900 may be performed, for example, by any other suitable system, environment, software, and hardware, or a combination of systems, environments, software, and hardware, as appropriate.

At 905, the original payment instrument image associated with a tangible payment instrument is received, the tangible payment instrument to be submitted for electronic transaction clearing and including a payee, a payor, an amount, and an authorization. In some cases, receiving the original payment instrument image associated with the tangible payment instrument includes receiving the original payment instrument image from an image scanner.

At 910, a clearing payment instrument image is created based on the original payment instrument image, the clearing payment instrument image associated with a first contrast value. In some cases, the original payment instrument image is a monochromatic image, and creating the clearing image includes is a bi-tonal image. The monochromatic image may be a grayscale image, and the bi-tonal image may be a black-and-white image. In some cases, the original payment instrument image is a color image.

At 915, the clearing payment instrument image is presented in the user interface in response to creating the clearing payment instrument image.

At 920, an indication of an area of the clearing payment instrument image is received from the user interface, the indicated area including less than the entire clearing payment instrument image.

At 925, an indication of a second contrast value to which to update the indicated area is received from the user interface, the second contrast value being different than the first contrast value. In some cases, the user interface does not allow updating of image properties of the indicated area of the clearing payment instrument image other than the contrast.

At 930, a contrast value of the indicated area of the clearing payment instrument image is updated to the second contrast value in response to receiving the indication of the area and receiving the indication of the second contrast value from the user interface. In some cases, the updated clearing payment instrument image is inserted into a cash letter file.

In implementations where the original payment instrument image is a color image, an indication of a red weight value, a green weight value, and a blue weight value may be received from the user interface; and the indicated area of the clearing payment instrument image may be updated based on the red weight value, the green weight value, and the blue weight value in response to receiving the indication of the weight value, the green weight value, and the blue weight value from the user interface.

The preceding figures and accompanying description illustrate example processes and computer implementable techniques. Environment 100 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
    updating an image property of an area of a clearing payment instrument image associated with a tangible payment instrument including a payee, a payor, an amount, and an authorization, the tangible payment instrument to be submitted for electronic transaction clearing, wherein the clearing payment instrument image is associated with a first value of the image property, the image property of the area is updated to a second value different than the first value of the image property, the image property of other areas of the clearing payment instrument image remains at the first value of the image property, and the area of the clearing payment instrument image includes less than the entire clearing payment image; and
    storing the updated clearing payment instrument image in response to updating the image property.

2. The method of claim 1, further comprising creating the clearing payment instrument image based on an original payment instrument image associated with the tangible payment instrument prior to updating the image property.

3. The method of claim 1, further comprising receiving the clearing payment instrument image from an external location prior to updating the image property.

4. The method of claim 2, further comprising identifying the original payment instrument image prior to creating the clearing payment instrument image.

5. The method of claim 4, wherein identifying the original payment instrument image includes scanning the tangible payment instrument with an image scanner.

6. The method of claim 4, wherein identifying the original payment instrument image includes identifying the original payment instrument image within a cash letter file.

7. The method of claim 4, wherein identifying the original payment instrument image includes receiving the original payment instrument image over a network in response to a request.

8. The method of claim 4, wherein identifying the original payment instrument image includes identifying a monochromatic payment instrument image, and creating the clearing payment instrument image includes creating a bi-tonal payment instrument image.

9. The method of claim 8, wherein the monochromatic payment instrument image is a grayscale payment instrument image, the bi-tonal payment instrument image is a black-and-white payment instrument image, and the image property includes contrast.

10. The method of claim 4, wherein identifying the original payment instrument image includes identifying a color payment instrument image.

11. The method of claim 10, wherein the image property includes a red weight value, a green weight value, and a blue weight value.

12. The method of claim 11, wherein creating the clearing payment instrument image from the original payment instrument image includes creating a monochromatic payment instrument image from the color payment instrument image based at least in part on the red weight value, the green weight value, and the blue weight value, and updating the image property of the area of the clearing payment instrument image includes updating at least one of the red weight value, the green weight value, or the blue weight value for the area.

13. The method of claim 11, wherein the image property further includes a contrast threshold value, and the creating the clearing payment instrument image from the original payment instrument image includes creating a bi-tonal payment instrument image from the color payment instrument image based at least in part on the red weight value, the green weight value, the blue weight value, and the contrast threshold value, and updating the image property of the area of the clearing payment instrument image includes updating at least one of the red weight value, the green weight value, the blue weight value, or the contrast threshold value for the area.

14. The method of claim 1, wherein storing the updated clearing payment instrument image includes inserting the updated clearing payment instrument image into a cash letter file.

15. The method of claim 1, further comprising:
    presenting the clearing payment instrument image in a user interface in response to creating the clearing payment instrument image;
    receiving an indication of the area of the clearing payment instrument image to adjust from the user interface; and
    receiving an indication of the second value of the image property from the user interface.

16. The method of claim 15, wherein the user interface does not allow updating of image properties of the indicated area of the clearing payment instrument image other than the image property.

17. The method of claim 1, wherein the tangible payment instrument includes at least one of a payment instrument, a money order, a cashier's check, or a deposit slip.

18. The method of claim 1, wherein updating the value of the area of the clearing payment instrument image to the second value includes determining that the updated area of the clearing payment instrument image is legible based at least in part on requirements of an electronic payment instrument clearing process.

19. The method of claim 2, wherein the tangible payment instrument is a first tangible payment instrument, the original payment instrument image is a first original payment instrument image, and the clearing payment instrument image is a first clearing payment instrument image, the method further comprising:
    identifying information from the first clearing payment instrument image;

associating the second value of the image property and the area of the first clearing payment instrument image with the identifying information from the first clearing payment instrument image;

determining that a second original payment instrument image associated with a second tangible payment instrument different than the first tangible payment instrument includes the identifying information; and updating a second clearing payment instrument image based on the second original payment instrument image based on the second value of the image property and the area of the first clearing payment instrument image associated with the identifying information.

20. The method of claim 19, wherein the identifying information includes an account number and a routing number.

21. The method of claim 1, wherein the updated clearing payment instrument image includes an alpha channel storing a value of the image property for each pixel in the updated clearing payment instrument image.

22. A non-transitory, computer-readable medium storing instructions operable when executed to cause at least one processor to perform operations comprising:

updating an image property of an area of a clearing payment instrument image associated with a tangible payment instrument including a payee, a payor, an amount, and an authorization, the tangible payment instrument to be submitted for electronic transaction clearing, wherein the clearing payment instrument image is associated with a first value of the image property, the image property of the area is updated to a second value different than the first value of the image property, the image property of other areas of the clearing payment instrument image remains at the first value of the image property, and the area of the clearing payment instrument image includes less than the entire clearing payment image; and storing the updated clearing payment instrument image in response to updating the image property.

23. A system comprising:

a remote storage location storing an original payment instrument image associated with a tangible payment instrument including a payee, a payor, an amount, and an authorization;

a user station including one or more processes operable to perform operations comprising:

receiving the original payment instrument image from the remote storage location;

presenting a clearing payment instrument image associated with the original payment instrument image in a user interface in response to receiving the original payment instrument image, the clearing payment instrument image associated with a first value of an image property;

receiving an indication of an area of the clearing payment instrument image to update from the user interface;

receiving an indication of a second value of the image property from the user interface to which to update the indicated area of clearing payment instrument image, the second value different than the first value of the image property; and in response to receiving the indications of the area and receiving the indication of the second value of the image property, updating the image property of the indicated area to the second value while maintaining the first value for the image property of other areas of the clearing payment instrument image.

24. The system of claim 23, wherein the remote storage location is an archive storing one or more original payment instrument images.

25. The system of claim 23, wherein the remote storage location is an image scanner, and the user station receiving the original payment instrument image includes receiving a scanned image of the tangible payment instrument.

26. The system of claim 23, the operations further comprising storing the updated clearing payment instrument image in response to updating the image property of the indicated area.

27. The system of claim 26, wherein storing the updated clearing payment instrument image includes inserting the updated clearing payment instrument image into a cash letter file.

28. The system of claim 23, wherein the user interface does not allow updating of image properties of the indicated area of the clearing payment instrument image other than the image property.

29. The system of claim 23, wherein the image property is contrast.

30. The system of claim 23, wherein the tangible payment instrument includes at least one of a payment instrument, a money order, a cashier's check, or a deposit slip.

31. A computer-implemented method executed by one or more processors, the method comprising:

updating an image property of an area of a clearing payment instrument image associated with a tangible payment instrument including a payee, a payor, an amount, and an authorization, the tangible payment instrument to be submitted for electronic transaction clearing, wherein the image property of the area is updated to a second value different than a first value of the image property associated with a rejected clearing payment image that is unsuitable for electronic transaction clearing, the image property of other areas of the clearing payment instrument image remains unchanged, and the area of the clearing payment instrument image includes less than the entire clearing payment image; and storing the updated clearing payment instrument image in response to updating the image property.

32. The method of claim 31, wherein the rejected clearing payment image is associated with a rejection reason indicating why the rejected clearing payment image is unsuitable for electronic transaction clearing.

33. The method of claim 32, wherein the rejection reason includes at least one of a missing corner, image noise, image skew, or darkness.

34. The method of claim 32, wherein the rejection reason includes illegibility of at least one of the payee, the payor, the amount, or the authorization.

* * * * *